United States Patent [19]
Komori et al.

[11] Patent Number: 4,977,412
[45] Date of Patent: Dec. 11, 1990

[54] OPTICAL SCANNING DEVICE

[75] Inventors: Shin Komori, Yokohama; Jun Azuma, Tokyo; Yoshiaki Watanabe, Yokohama, all of Japan

[73] Assignee: Canon Kabushiki Kaisha, Tokyo, Japan

[21] Appl. No.: 286,841

[22] Filed: Dec. 20, 1988

[30] Foreign Application Priority Data

Dec. 21, 1987 [JP] Japan .................................. 62-323291

[51] Int. Cl.$^5$ ............................................ G01D 15/16
[52] U.S. Cl. .................................... 346/108; 200/61.7; 174/48
[58] Field of Search ....................... 316/108, 76 L, 160; 200/61.7, 61.81, 61.82, 296; 174/48; 248/27.1, 27.3

[56] References Cited
U.S. PATENT DOCUMENTS
4,053,701 10/1977 Ogilvie .................................. 174/48

4,682,244 7/1987 Ishitate .................................. 346/108

Primary Examiner—Mark J. Reinhart
Attorney, Agent, or Firm—Fitzpatrick Cella Harper & Scinto

[57] ABSTRACT

An optical scanning device comprises a beam source unit having a laser source, and a housing on which the beam source is mounted. The housing accommodates optical components through which a laser beam from the beam source unit is applied to the surface of an object thereby to optically scan the object surface. The housing includes a base plate carrying the optical components and a side wall provided with a beam source mounting portion which enables the beam source mounting portion which enables the beam source unit to be mounted and demounted on and from the side wall by a vertical movement of the beam source unit. Alternatively, the side wall of the housing is provided with a locating portion which provides a locating surface parallel to the optical axis of the laser beam.

13 Claims, 6 Drawing Sheets

OPTICAL SCANNING DEVICE

BACKGROUND OF THE INVENTION

1. Field of the Invention

The present invention relates to an optical scanning device which is capable of scanning an object surface with a laser beam. More particularly, the present invention is concerned with a scanning type optical device suitable for use in a recording apparatus such as a laser beam printer.

2. Description of the Related Art

Figure 10:
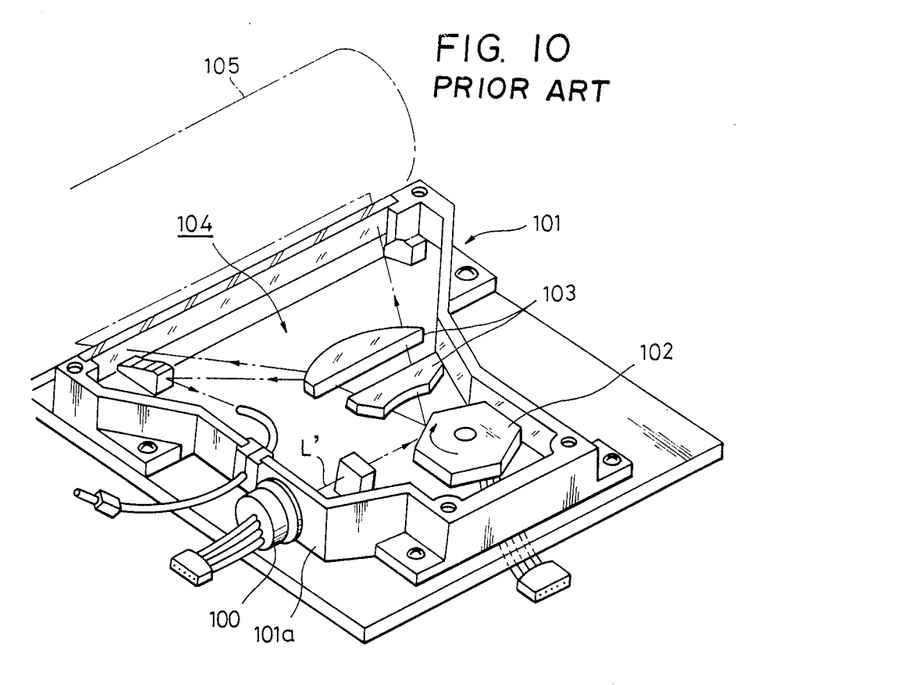
FIG. 10 is a perspective view of a known optical scanning device.

FIG. 10 illustrates a known optical scanning device capable of scanning an object surface with a laser beam. This optical scanning device has a beam source unit 100 including a laser source. An image exposure scanning operation is executed by applying the laser beam L' from the beam source unit 100 to a photosensitive member 105 through a scanning optical system 104 which includes a rotary polygonal mirror 102 and a group of lenses 103 and which is housed in a housing 101, whereby an image scan of the surface of the photosensitive member 105 is executed.

In order to obtain a high degree of accuracy of image formation on the photosensitive member 105, it is important that the beam source unit 100 and the components of the optical scanning system 104 such as the rotary mirror 102 and the group of lenses 103 are precisely located in relation to each other.

In addition, contamination of optical members such as the rotary polygonal mirror by dust and other foreign matter which may attach thereto should be avoided.

In order to achieve a high degree of scanning precision, the beam source unit 100 and other optical members are mounted on predetermined portions of a housing 101. The housing 101 has a cover portion (not shown) which effectively keeps dust and other foreign matter from internal optical parts.

The beam source unit 100 will be described in more detail.

Figure 11:
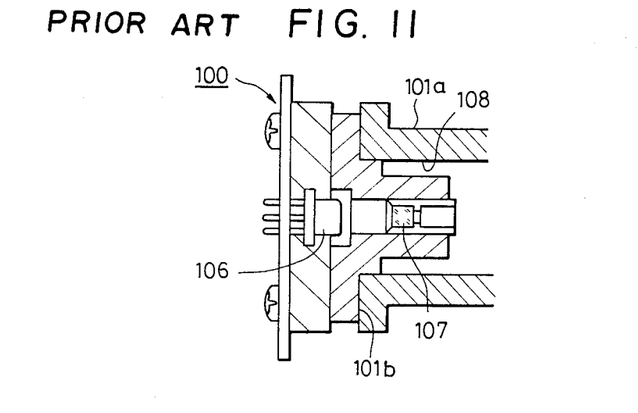
FIG. 11 is a longitudinal sectional view of a beam unit mounting structure in the device shown in FIG. 10.

As shown in FIG. 11, the beam source unit 100 includes a laser chip 106 and a collimator lens 107 which collimates the laser beam emitted from the laser chip 106 into a parallel beam and which is assembled together with the laser chip 106.

The beam source unit 100 is fit in a mounting hole 108 formed in a side wall 101a of the housing 101 from the exterior of the housing 101 so that the position of emission of the laser beam is precisely determined. In addition, an abutment member having an abutment surface 101b orthogonal to the laser beam axis is provided so as to locate and fix the beam source unit 100 in the direction of the optical axis.

In the known scanning device of the type described, it is necessary that the mounting hole 108 is formed to have a size which is slightly greater than the size of the beam source unit 100, in order to accommodate any tolerance in the machining of the hole 108, we well as any fluctuation in the size of the beam source unit 100 which may be incurred in the course of manufacture of the beam source unit 100.

It is therefore necessary to perform a time-consuming and high-precision step in order to ensure that the beam source unit 100 is correctly centered with respect to the mounting hole 108 so as to set the beam source unit 100 in correct optical alignment with the associated optical parts.

On the other hand, there is an increasing demand for mass-production of optical scanning system, to cope with current demand for laser beam printers and other apparatuses which incorporate this type of device.

The mass-production of optical scanning system is preferably conducted through an automatic assembly process which employs industrial robots. Such an automatic assembly process, however, encounters a difficulty due to the delicate and troublesome adjusting operation which is indispensable for correctly centering the beam source unit with respect to the mounting hole.

Usually, the housing 101 is formed by molding from a resin. The configuration of the housing 101 is complicated due to the presence of the mounting hole 108 and the abutment surface 101b for locating the beam source unit in the direction of the optical axis, so that it is not easy to mold the housing with a high degree of precision.

This imprecision may lead to such imprecision in the position of the beam source unit 100 that the laser beam L' running towards the rotary polygonal mirror is deviated from the designated optical path, with the result that the scanning beam is aimed at the wrong position or that the scanning line warps undesirably.

For these reasons, it is very important that the molding of the housing is conducted with the greatest care and high degree of precision.

The optical scanning device is usually located on an end portion of the apparatus which incorporates the scanning device. In addition, various components and parts are densely arranged around the optical scanning device in order to meet the requirement for a compact design of the apparatus.

When the laser chip of the beam source unit has been exhausted or becomes defective, it is necessary to demount the beam source unit and then mount a new beam source unit on the housing. This requires a laborious work for demounting and remounting various parts and components around the beam source unit.

SUMMARY OF THE INVENTION

An object of the present invention is to provide an optical scanning system in which optical alignment of the laser beam can be attained very easily.

Another object of the present invention is to provide an optical scanning device which enables the beam source unit to be mounted on a housing without necessitating any positional adjustment.

Still another object of the present invention is to provide an optical scanning device which enables replacement of the laser unit without requiring other components of the optical scanning unit to be demounted.

To these ends, according to the present invention, there is provided an optical scanning device comprising: a beam source unit having a laser source; and a housing on which the beam source unit is mounted, the housing accommodating optical components for enabling a laser beam from the beam source unit to scan the surface of a scanning object; wherein the housing includes a base plate carrying the optical components and a side wall provided with a bean source mounting portion which enables the beam source unit to be mounted and demounted on and from the side wall by a vertical movement of the beam source unit.

These and other objects, features and advantages of the present invention will become clear from the following description of the preferred embodiments taken in conjunction with the accompanying drawings.

DESCRIPTION OF THE PREFERRED EMBODIMENTS

Preferred embodiments of the present invention will be described hereinafter with reference to the accompanying drawings. Throughout the drawings, the same reference numerals are used to denote similar parts or members.

Figure 1:
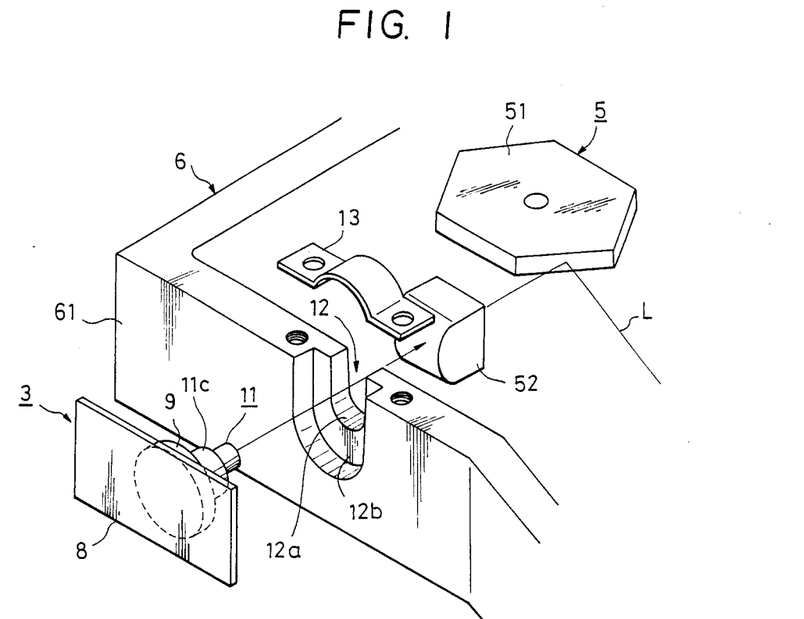
FIG. 1 is a schematic exploded perspective view of a beam source mounting structure in an embodiment of the optical scanning device of the present invention.
Figure 2:
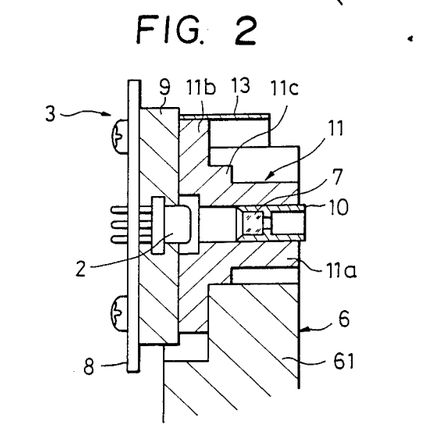
FIG. 2 is a schematic longitudinal sectional view of the mounting structure shown in FIG. 1.
Figure 3:
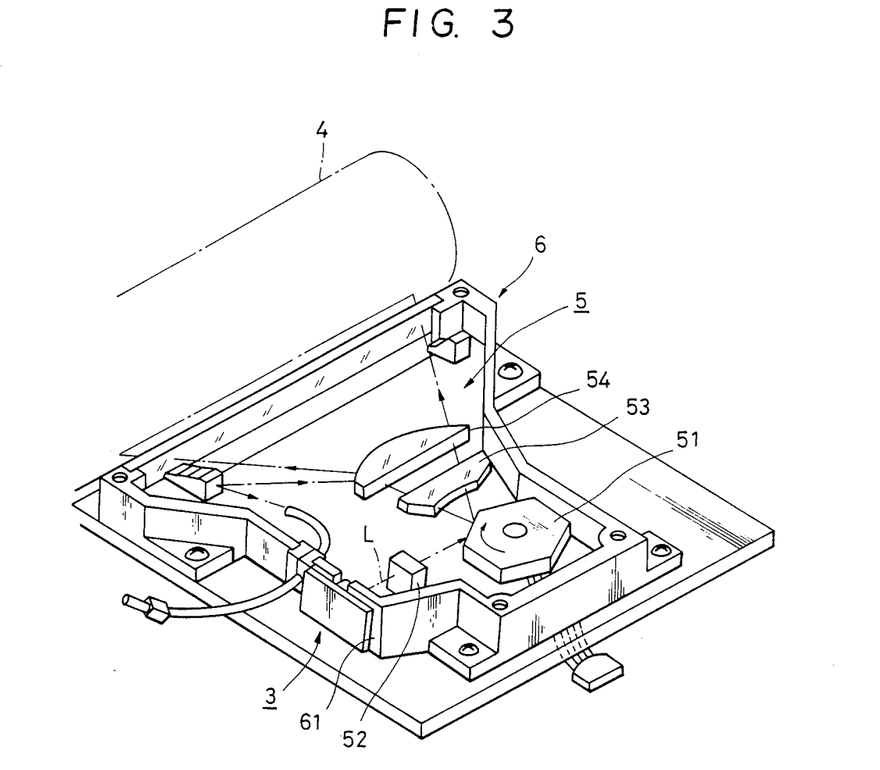
FIG. 3 is a perspective view of an optical scanning device having the mounting structure shown in FIG. 1.

Referring to FIGS. 1 to 3, an optical scanning device embodying the present invention is shown and includes a beam source unit 3 having a laser source 2, and an optical scanning system 5 through which a laser beam L emitted from the beam source unit 3 is applied to the surface of a photosensitive drum 4 as a scanned object, whereby the surface of the photosensitive drum is exposed to an scanned by the laser beam. The beam source unit 3 and the scanning optical system are mounted on a single housing 6.

The laser source 2 of the beam source unit 3 has a semiconductor laser capable of emitting on command a laser beam, and a collimator lens 7 which is capable of converting the laser beam from the laser source 2 into a parallel beam. The laser source 2 and the collimator lens 7 are assembled together leaving a predetermined gap therebetween, so as to provide an assembly. More specifically, the laser source 2 is mounted on a control blase plate 8 carrying a control circuit, through the intermediary of a first holder 9 which is made of aluminum. On the other hand, the collimator lens 7 is held in a cylindrical collimator lens barrel 10 made of a magnetic material. The collimator lens barrel 10 is connected to the first holder 9 through a second holder 11 made of aluminum. The second holder 11 is a stepped cylindrical member having a small-diameter portion 11a capable of holding the collimator lens barrel 10 and a large-diameter flange portion 11b at which the second holder 11 is connected to the first holder 9. The collimator lens barrel holding portion 11a and the flange portion 11b are connected through a step 11c. The flange portion 11b has end surfaces which have been machined precisely so as to provide planes orthogonal to the optical axis. Thus, the flange portion 11b provides, upon contact with a surface of the housing 6, a reference position for locating the beam source unit in the direction of the optical axis. The outer peripheral surface of the step 11c is machined in a cylindrical form with a high degree of precision so as to provide a reference surface which is parallel to the optical axis of the laser beam and which enables the position of emission of the laser beam to be determined precisely.

The first holder 9 and the second holder 1 are made from a metal, particularly aluminum, so that the reference surfaces may be machined highly precisely.

On the other hand, the housing 6 molded from a resin has a side wall 61 which is provided on the upper end thereof with a U-shaped fitting recess 12 which serves as a beam source unit mounting portion for mounting the beam source unit 3. The recess 12 has a surface which is parallel to the optical axis and which is dimensioned to fit the outer peripheral surface of the step portion 11c of the second holder 11 which provides a reference for locating or aligning the beam source unit 3. The U-shaped recess 12 has opposing walls which are spaced from each other by a distance equal to the outside diameter of the second holder 11c and which extend downward from the upper edge of the side wall 61 of the housing 6 at a right angle to the upper edge. The bottom 12a of the U-shaped recess 12 is provided by a semi-circular groove which continues from the lower ends of the opposing walls and which has a curvature conforming with that of the step portion 11c of the second holder 11. The second holder 11 is adapted to be dropped into the recess 12 in a vertical direction orthogonal to the optical axis until it rests on the bottom 12a of the recess, so that the beam source unit 3 is located or aligned both in X- and Y-directions which are orthogonal to the optical axis. The outer surface of the side wall 61 of the housing 6 is at the portion thereof around the recess 12, so as to provide a step 12b. The flange portion 11b of the second holder 11 of the beam source unit 3 is adapted to abut the step 12b so that the beam source unit 3 is located in the direction of the optical axis. Thus, the bottom 12a of the recess 12 and the step 12b provide locating means in the device of the present invention.

In mounting the beam source unit 3, the beam source unit 3 is slipped into the recess 12 so as to be precisely located or aligned by means of these reference surfaces. Then, the beam source unit 3 is fixed to the housing 6 by means of a suitable fixing member 13.

The optical scanning system 5 has a rotary polygonal mirror 51 capable of reflecting the laser beam L emitted from the beam source unit 3, a cylindrical lens 52 interposed between the beam source unit 3 and the rotary polygonal mirror 51, and lenses 53 and 54 which are interposed between the rotary polygonal mirror 51 and the photosensitive drum 4 as a scanned object.

In this embodiment, the beam source unit 3 can be automatically located in the X- and Y-directions orthogonal to the optical axis of the bean source unit 3 can be precisely fixed with respect to the housing, because the second holder 11 closely fits in the bottom 12a of the recess 12 formed in the side wall 61 of the housing. This effect is attained simply by slipping or dropping the second holder 11 into the recess 12. Since the second holder 11 has a cylindrical form, the insertion of the second holder 11 into the recess 12 can be conducted without trouble such as interference with the top edges of the recess 12, even if the second holder 11 has been slightly offset from the recess 12. Thus, the assembly work is remarkably facilitated. After fitting the second holder 11 into the recess 12, the beam source unit 3 is slid inwardly of the housing 6 in the direction of the optical axis until the flange portion 11b of the second holder 11 is stopped by the step 12b which provides a reference plane orthogonal to the optical axis, whereby the beam source unit 3 is automatically and precisely located or aligned in the direction of the optical axis.

Thus, the mounting of the beam source unit 3 on the housing 6 includes very simple tasks, i.e., to slip or drop the beam source unit 3 into the recess 12 and to axially slide the same in the direction of the optical axis. Such simple tasks can easily be conducted automatically by a suitable industrial robot.

Preferably, adjusting operations such as an adjustment of the focusing condition of the laser beam is carried out by, for example, shifting the cylindrical lens 52, so as to attain a higher precision of scanning with the laser beam.

It is also to be understood that the molding of the housing 6 from a resin can be conducted with a high degree of precision and without requiring any core mold part, because the recess 12 for receiving the second holder has a very simple form extending from the upper edge of the side wall 61.

Figure 4:
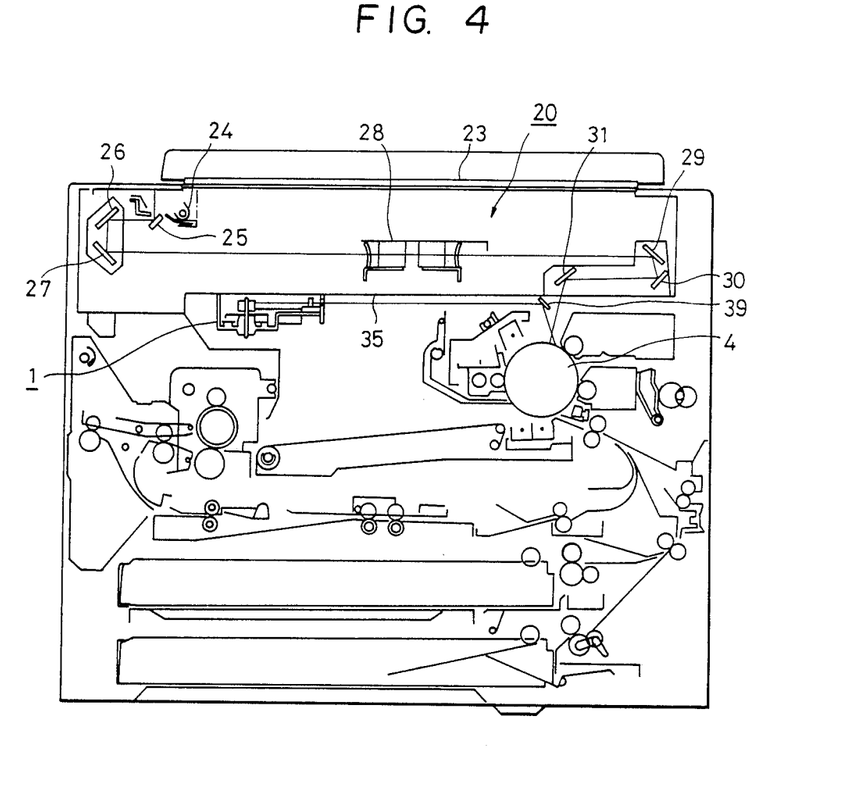
FIG. 4 is a schematic side elevational view of an image forming apparatus which incorporates the optical scanning device of FIG. 2.

FIG. 4 shows, by way of example, an image forming apparatus which incorporates the optical scanning device of the type described hereinbefore. The image forming apparatus has a first optical system 20, the scanning device 1 serving as a second optical system, and a photosensitive drum 4.

The first optical system 20 includes a lamp 24 capable of illuminating an original which is set on an original table 23, mirrors 25, 26 and 27, a lens 28, and mirrors 29, 30 and 31. The light reflected by the original is made to impinge upon the lens 28 via the mirrors 25, 26 and 27, and the light emanating from the lens 28 is applied to the surface of the photosensitive drum 4 through mirrors 29, 30 and 31.

The optical scanning device 1 serving as the second optical system can be used in various manners. For instance, the optical scanning device 1 may be connected to the output of an external device such as a computer or a word processor so as to function as a latent image forming device. In such a case, it is possible to form on the surface of the photosensitive drum 4 a composite image which is composed of an image component derived from the first optical system 20 and an image component formed by the second optical system. The optical scanning device 1 also can be used as a charge removing device which removes electrostatic charges from a region of the surface of the photosensitive drum 4 corresponding to a blank or top margin portion of an image or a non-imaging region corresponding to an interval between two successive copy papers. The optical scanning device 1 also may be connected to a suitable coordinate input device such as a digitizer so that it may perform a masking function for eliminating or removing any unnecessary portion of an image formed by the first optical system 20 or a trimming function for suitably trimming the image formed by the first optical system 20.

The optical scanning device 1 also can have an add-on function in which a portion of the optical path of the first optical system is interrupted and additional data which is not included in the original image, e.g., page numbers, dates and so forth, are recorded in a blank region which has been formed as a result of the partial interruption of the optical path of the first scanning system 20.

Figure 5:
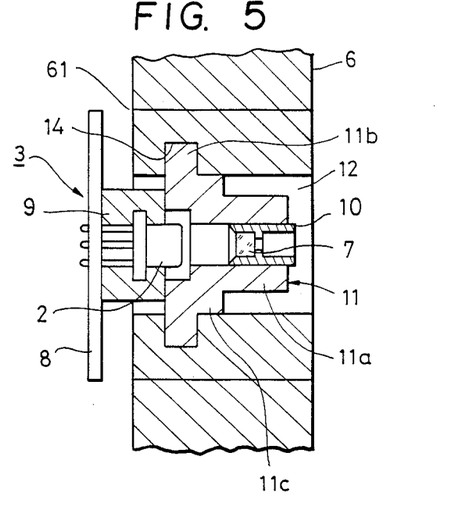
FIG. 5 is a sectional plan view of a beam source mounting structure in a second embodiment of the optical scanning device of the present invention.

FIG. 5 shows a second embodiment of the optical scanning device of the present invention. As in the case of the first embodiment, the second embodiment employs a substantially U-shaped fitting recess 12 formed in a side wall 61 of the housing 6 for receiving the beam source unit 3. In the second embodiment, however, the beam source unit 3 is located or aligned in the direction of the optical axis by a cooperation between the flange portion 11b of the second holder 11 and grooves 14 which are formed in the inner peripheral surface of the recess 12 and which are capable of slidably receiving the flange portion 11b. This arrangement is advantageous in that the beam source unit 3 can be positioned also in the direction of the optical axis simply by allowing the beam source unit 3 to slide down into the recess 12 such that the flange portion 11b of the second holder slides along the grooves 14. Other portions are materially identical to those of the first embodiment, so that detailed description is omitted in regard to such portions.

Figure 6:
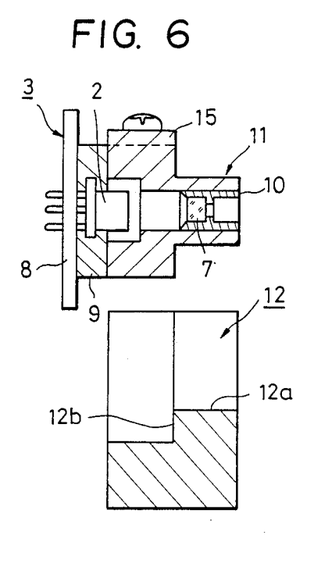
FIG. 6 an exploded longitudinal sectional view of a beam source mounting structure in a third embodiment of the optical scanning device of the present invention.
Figure 7:
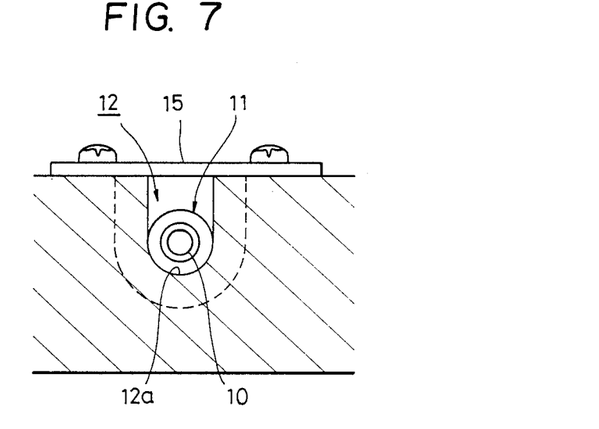
FIG. 7 is a side elevational view of the beam source unit mounting structure of the embodiment shown in FIG. 6.

FIGS. 6 and 7 show a third embodiment of the optical scanning device of the present invention. This embodiment also employs a substantially U-shaped recess 12 formed in a side wall 61 of the housing 6 so that the beam source unit 3 can be mounted simply by being dropped into the recess 12. The third embodiment, however, does not have any special fixing means. Instead, the third embodiment has a fixing flange 15 provided on the upper end of the second holder 11. The beam source unit 3 is fixed to the housing 6 through the fixing flange 15. This arrangement eliminates any necessity for a separate fixing member such as the fixing member 13 used in the first embodiment, thus reducing the number of components and facilitating the assembly.

In this third embodiment, the beam source unit 3 is located or aligned by means of the fitting recess 12 and the step 12b of the recess 12 as in the case of the first embodiment. This embodiment, however, may be used also in such a case where the beam source unit is located by other locating means such as locating pins provided on the housing.

In general, it is desirable that the optical scanning device is kept away from dust and other foreign matter, as well as from ozone. In the third embodiment, the interior of the housing is sealed from the exterior by virtue of the cover on the housing 6. The cover may be provided with a portion which presses the beam source unit. In such a case, the beam source unit is fixed by the cover, so that the fixing member 13 or fixing flange 15 in the case of the third embodiment can be dispensed with.

Figure 8:
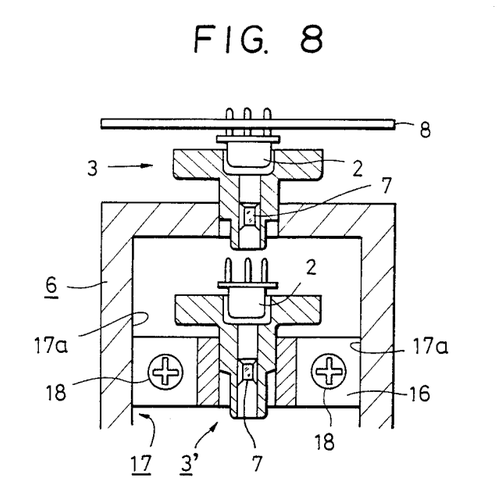
FIG. 8 is a plan vie of a beam source unit mounting structure in a fourth embodiment of the optical scanning device of the present invention.
Figure 9:
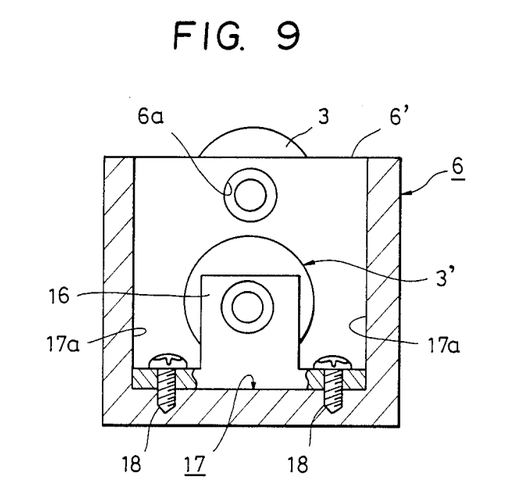
FIG. 9 is a front elevational view of the embodiment shown in FIG. 8.

FIGS. 8 and 9 show a fourth embodiment of the optical scanning device in accordance with the present invention. This optical scanning device employs a pair of beam source units 3 and 3'. This type of device is usable for achieving various effects such as multi-color printing, high-speed printing and high-resolution printing in laser printer, laser copying machines and other similar apparatus. These two beam source units are arranged vertically such that a first one 3 of these units is placed above the other 3'. More specifically, the lower beam source unit 3' is disposed immediately under the upper beam unit 3 but is slightly offset forwardly from the position of the upper beam source unit 3. This arrangement minimized the distance between the beam emitting points of both beam source units while avoiding any interference between the beams from both units, thus saving the installation space.

A hold member 16 as a locating reference means is secured to the lower beam source unit 3'. On the other hand, the housing 6 is provided with a beam source unit mounting portion 17 which has an upwardly-opened rectangular cross-section and which is designed for receiving the hold member 16. In the assembly, the lower surface of the hold member 16 contacts the bottom surface of the beam source mounting portion 17n so that the beam source unit 3' is located or aligned in the vertical direction. At the same time, left and right ends of the hold member 16 abut both side walls 17a and 17a of the beam source unit mounting portion 17 so that the beam source unit 3' is located or aligned in the left and right directions with respect to the optical axis. In addition, small screws 18, 18 serve as locating pins for locating the beam source unit 3' in the direction of the optical axis. This arrangement enables the lower beam source unit 3' to be precisely located or aligned simply by being dropped into the beam source unit mounting portion 17 with the hold member 16 engaging with the surfaces of the mounting portion 17 followed by sliding in the direction of the optical axis. Thus, the lower beam source unit 3' can be mounted very easily. In the arrangement shown in FIG. 8, the upper beam source unit 3 is designed to be fixed to the housing 6 by being inserted into a mounting bore 6a formed in the housing 6. However, the arrangement may be such that the upper beam source unit 3 is made to fit in a recess formed in the upper edge of the side wall of the housing, as in the case of the first three embodiments.

As will be understood from the foregoing description, the present invention eliminates the necessity for laborious adjustment which hitherto have been necessary for correctly locating or aligning the beam source unit when the same is mounted on a housing, so that the mounting operation can be remarkably simplified. In addition, the beam source unit can be precisely located or aligned by virtue of the locating reference surfaces which are provided on the beam source unit and which cooperate with locating portions provided in the beam source unit mounting portion.

Therefore, the optical scanning device of the present invention can be assembled automatically by, for example, an industrial robot, thus contributing to a reduction in the number of the steps and the time required for the assembly process, as well as production cost. In addition, the housing can be molded with a simple mold with no core mold part which has been hitherto necessary for the purpose of forming a hole or a bore in the wall of the housing. The use of the simple mold also ensures that the beam source mounting portion can be finished with a high degree of precision, thus contributing to the improvement in the precision of location of the beam source unit.

In addition, the beam source unit can be mounted and demounted through a simple vertical movement, so that the replacement of the beam source unit can be conducted without requiring demounting of other components of the optical scanning device, with the result that the degree of freedom in the design of the device is greatly improved.

Although the invention has been described though specific terms, it is to be noted that the described embodiments are only illustrative and various changes and modifications may be imparted thereto without departing from the scope of the invention which is limited solely by the appended claims.

What is claimed is:

1. An optical scanning device comprising:
    a beam source unit having a laser source; and
    a housing on which said beam source unit is mounted, said housing accommodating optical components for enabling a laser beam from said beam source unit to scan the surface of a scanned object;
    said housing including a base plate carrying said optical components and a side wall provided with a beam source mounting portion to which said beam source unit is detachably mounted by a vertical movement of said beam unit;
    said beam source unit being located vertically when mounted in said side wall.

2. An optical scanning device according to claim 1, wherein said beam source unit further includes a collimator lens for collimating the laser beam emitted from said laser source.

3. An optical scanning device according to claim 1, wherein said beam source unit is capable of being mounted and demounted on and from said side wall also by a lateral movement with respect to said side wall.

4. An optical scanning device according to claim 1, wherein said scanned object is a photosensitive member of a laser beam printer.

5. An optical scanning device comprising:
    a beam source unit having a laser source; and
    a housing on which said beam source unit is mounted, said housing accommodating optical components for enabling a laser beam from said beam source unit to scan the surface of a scanned object;
    wherein said housing includes a side wall provided with a locating portion which provides an alignment reference surface substantially parallel to the optical axis of said laser beam.

6. An optical scanning device according to claim 5, wherein said beam source unit includes second locating portion providing a second reference surface parallel to the optical axis of said laser beam, said locating reference surface of said locating portion of said housing and said second locating surface of said second locating portion of said beam source unit being contactable with each other so as to align said beam source unit with respect to said housing.

7. An optical scanning device according to claim 5, wherein said beam source unit is located with respect to said locating means of said housing from the upper side of said housing.

8. An optical scanning device according to claim 5, wherein said locating portion of said housing and said second locating portion of said beam source unit have arcuate forms when viewed in section perpendicular to the axis of said laser beam.

9. An optical scanning device according to claim 5, wherein said beam source unit can be constructed to be mounted on and demounted from said housing by movements both in the direction of the optical axis of said laser beam and in the direction perpendicular to said optical axis.

10. An optical scanning device according to claim 5, wherein said beam source unit further includes a collimator lens for collimating the laser beam emitted from said laser source.

11. An optical scanning device according to claim 5, wherein said scanned object is a photosensitive member of a laser beam printer.

12. An optical scanning device according to claim 5, wherein said beam source unit includes locating portion made from a metal and said housing is molded from a resin.

13. An optical scanning device according to claim 1, wherein said side wall includes a locating portion for locating said beam source unit vertically by stopping downward movement of said beam source unit.

* * * * *